United States Patent
Mabuchi (10) Patent No.: US 7,777,798 B2
(45) Date of Patent: Aug. 17, 2010

(54) PHYSICAL QUANTITY DETECTING DEVICE, METHOD OF DRIVING THE PHYSICAL QUANTITY DETECTING DEVICE AND IMAGING APPARATUS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 11/556,444

(22) Filed: Nov. 3, 2006

(65) Prior Publication Data
US 2007/0109436 A1 May 17, 2007

(30) Foreign Application Priority Data
Nov. 7, 2005 (JP) ............... P2005-321753

(51) Int. Cl.
H04N 3/14 (2006.01)
H04N 5/235 (2006.01)
(52) U.S. Cl. ............... 348/308; 348/362
(58) Field of Classification Search ........... 348/221.1, 348/222.1, 229.1, 294, 297, 308, 362
See application file for complete search history.

(56) References Cited

U.S. PATENT DOCUMENTS

| | | | |
|---|---|---|---|
| 6,573,936 B2 * | 6/2003 | Morris et al. | 348/308 |
| 6,606,120 B1 * | 8/2003 | Merrill et al. | 348/273 |
| 6,753,912 B1 * | 6/2004 | Wayne | 348/241 |
| 7,190,398 B1 * | 3/2007 | Yadid-Pecht et al. | 348/308 |
| 7,230,558 B2 * | 6/2007 | Su-Hun | 341/155 |
| 7,456,876 B2 * | 11/2008 | Funakoshi et al. | 348/241 |
| 7,554,589 B2 * | 6/2009 | Boemler | 348/302 |
| 2005/0237406 A1 * | 10/2005 | Kim et al. | 348/308 |
| 2007/0120985 A1 * | 5/2007 | Hashimoto | 348/222.1 |

OTHER PUBLICATIONS

Orly Yadid-Pecht and Eric R. Fossum; Wide Intrascene Dynamic Range CMOS APS Using Dual Sampling; IEEE Transactions on Electron Devices; vol. 44, No. 10; Oct. 1997.

* cited by examiner

Primary Examiner—Lin Ye
Assistant Examiner—Trung Diep
(74) Attorney, Agent, or Firm—Sonnenschein Nath & Rosenthal LLP (57) ABSTRACT

A physical quantity detecting device includes: a pixel array that has pixels two-dimensionally arranged in a matrix, each converting a physical quantity supplied from the outside into an electric signal; a driving circuit that scans, as read rows, N rows of pixels (N is an integer equal to or larger than 3) in the pixel array at the same time and reads out signals corresponding to the pixels in the read rows; and M signal processing circuit groups (1<M<N) each of which has M column circuits provided for each column of pixels of the pixel array, sequentially receives and processes signals output from the read rows, and when a scanning unit period is H, processes signals of the next read row within an average period of (M/N)H.

8 Claims, 12 Drawing Sheets

PHYSICAL QUANTITY DETECTING DEVICE, METHOD OF DRIVING THE PHYSICAL QUANTITY DETECTING DEVICE AND IMAGING APPARATUS

CROSS REFERENCES TO RELATED APPLICATIONS

The present invention contains subject matter related to Japanese Patent Application JP 2005-321753 filed in the Japanese Patent Office on Nov. 7, 2005, the entire contents of which being incorporated herein by reference.

BACKGROUND OF THE INVENTION

1. Field of the Invention

The invention relates to a physical quantity detecting device for detecting a physical quantity supplied from the outside, to a method of driving the physical quantity detecting device, and to an imaging apparatus using a solid-state imaging device for detecting light incident from the outside as a physical quantity.

2. Description of the Related Art

A solid-state imaging device for detecting the intensity of light incident via a subject as a physical quantity or a fingerprint detecting device (capacitance detecting device) for detecting capacitance formed to correspond to a fingerprint between a detecting electrode and the surface of a finger has known as a physical quantity detecting device for detecting a physical quantity supplied from the outside.

For example, in the solid-state imaging device, which is a kind of physical quantity detecting device, in a pixel array having pixels two-dimensionally arranged in a matrix, each including a photoelectric converter, two rows of pixels are scanned at the same time, and signal charges are stored in the pixels in the two rows at different storage times. Then, the difference between the storage times causes two signals having different sensitivities to be generated, and the signals having different sensitivities are synthesized to obtain a wide dynamic range (for example, see the following document: Orly Yadid-Pecht and Eric R. Fossum, "Wide Intrascene Dynamic Range CMOS APS Using Dual Sampling," IEEE TRANSACTIONS ON ELECTRON DEVICES, VOL. 44, NO. 10, pp. 1721 to 1723, OCTOBER 1997).

Figure 12:
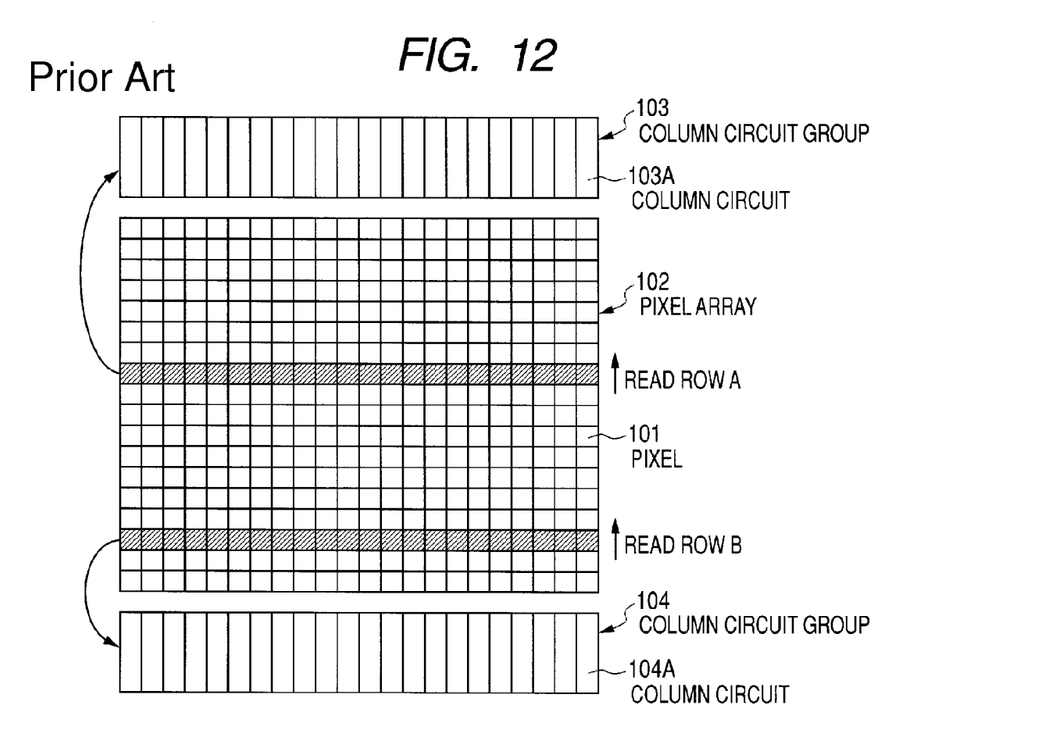
FIG. 12 is a conceptual diagram illustrating the related art.

The related art will be described in detail below. FIG. 12 is a conceptual diagram illustrating the related art. In FIG. 12, two column circuit groups 103 and 104 are arranged above and below a pixel array 102 that has a plurality of pixels 101 two-dimensionally arranged in a matrix, each having a photoelectric converter. In the column circuit groups 103 and 104, a pair of column circuits 103A and 104A are arranged so as to correspond to one column of pixels in the pixel array 102. In FIG. 12, a scanning system for each pixel 101 of the pixel array 102 is not shown.

Two rows of pixels 101 in the pixel array 102 are scanned as read rows A and B at the same time. Since the read row A and the read row B have different storage times, two signals having different sensitivities are obtained. Signals of the pixels in the read row A are read by the column circuit group 103 and are then processed by the column circuits 103A. Signals of the pixels in the read row B are read by the column circuit group 104 and are then processed by the column circuits 104A.

Figure 13:
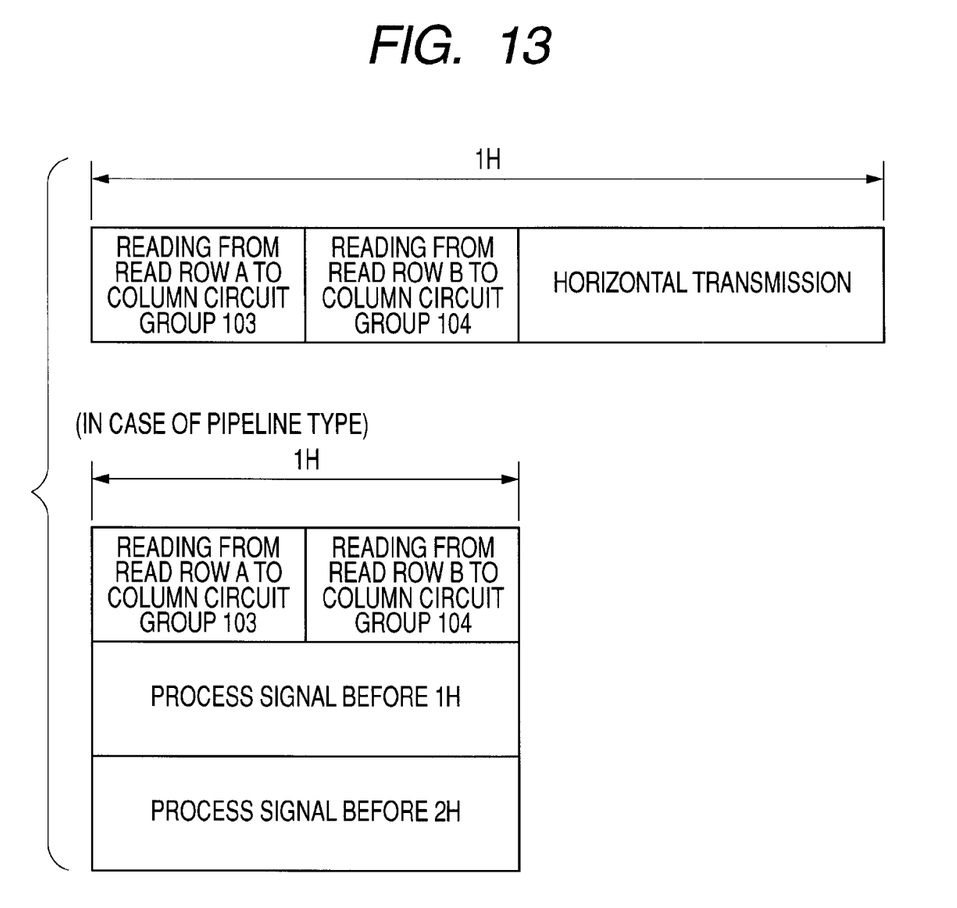
FIG. 13 is a diagram illustrating the operation of two column circuit groups within a period of 1H.

FIG. 13 is a diagram illustrating the operation of the two column circuit groups 103 and 104 within a period of 1H. In FIG. 13, the period of 1H means a period for which one read row A or B is scanned.

First, the column circuit group 103 reads signals from the pixels in the read row A and the column circuits 103A of the column circuit group 103 process the signals and store the processed signals. Then, the column circuit group 104 reads signals from the pixels in the read row B and the column circuits 104A of the column circuit group 104 process the signals and store the processed signals. Thereafter, the column circuit groups 103 and 104 perform horizontal scanning to sequentially read out the signals. When the operation for the period of 1H is terminated, the next read row A and the next read row B are scanned, and this operation is repeatedly performed.

When the column circuits 103A and 104A of the column circuit groups 103 and 104 process the signals in a pipeline manner (in the case of a pipeline type), the following operation is performed.

First, signals are read from the pixels in the read row A to a first stage of each of the column circuit 103A of the column circuit group 103, and signals are read from the pixels in the read row B to a first stage of each of the column circuit 104A of the column circuit group 104. Then, the signal in the first stage of each of the column circuits 103A and 104A is transmitted to a second stage, and then the operation for the period of 1H is terminated. In the next period of 1H, while signals of the next row are read in the first stage of each of the column circuits 103A and 104A, the previous signals are processed in the second stage and the processed signals are transmitted to the next stage. These operations are repeatedly performed, and finally, the signals are horizontally transmitted within a period of 1H.

In the above-mentioned read operations, since two column circuit groups (103 and 104) are provided for each column of pixels, signals corresponding to two rows of pixels are processed within a period of 1H (the latter is similar to the former in that signals corresponding to two rows of pixels are processed within a period of 1H regardless of whether the time from input to output is several times longer than the period of 1H).

SUMMARY OF THE INVENTION

In order to extend a dynamic range, it is preferable to synthesize three or more signals having different storage times rather than to synthesize two signals having different storage times. As a modification of the related art, a technique for scanning three or more rows of pixels at the same time and providing three or more column circuits for each column of pixels (providing three or more column circuit groups) has been considered.

However, it is difficult to arrange three or more column circuit groups from the viewpoint of the layout, or this structure may cause disadvantages. For example, it is considered that column circuits are arranged at pitches that is half or one third of the pitch between the pixels. However, with a reduction in the size of a pixel, it is difficult to arrange the column circuits at very small pitches, it may cause the deterioration of the usage efficiency of area, or it may cause an increase in the number of column circuit groups, resulting in an increase in chip cost.

Figure 14:
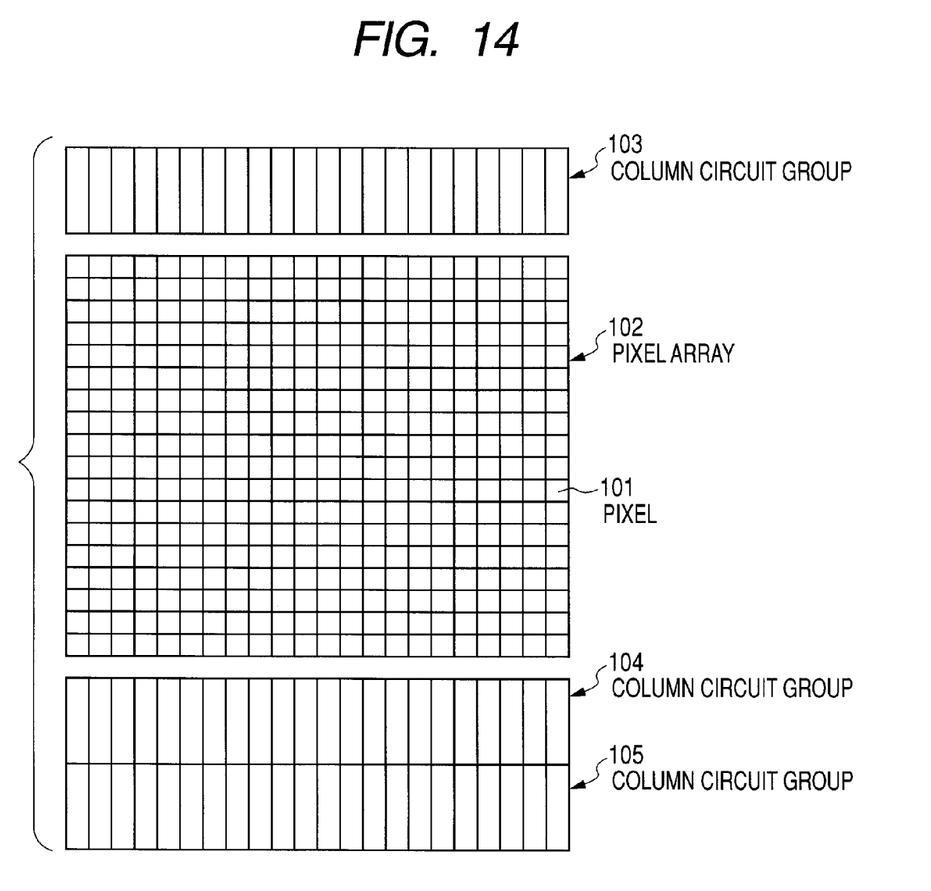
FIG. 14 is a diagram illustrating a problem to be solved when three column circuit groups are provided.

As shown in FIG. 14, when column circuit groups 104 and 105 are arranged so as to overlap each other in the vertical direction in plan view, the total length of the column circuits increases, which prevents a reduction in the size of a chip. In addition, signal lines should extend to column circuits 105A of the column circuit group 105 further away from the pixel array 102 through column circuits 104A of the column circuit group 104 closer to the pixel array 102, which results in complicated wiring and noise. Therefore, it is difficult to arrange a plurality of column circuit groups for each column of pixels so as to overlap each other in the vertical direction in plan view.

Thus, it is desirable to provide a physical quantity detecting device capable of synthesizing three or more signals having different storage times to obtain a wide dynamic range and processing signals of one column of pixels with a small number of column circuits, a method of driving the physical quantity detecting device, and an imaging apparatus provided with the physical quantity detecting device.

According to an embodiment of the invention, a physical quantity detecting device includes: a pixel array that has pixels two-dimensionally arranged in a matrix, each converting a physical quantity supplied from the outside into an electric signal; a driving circuit that scans, as read rows, N rows of pixels (N is an integer equal to or larger than 3) in the pixel array at the same time and reads out signals corresponding to the pixels in the read rows; and M signal processing circuit groups (1<M<N) each of which has M column circuits provided for each column of pixels of the pixel array. When a scanning unit period is 1H, each of the signal processing circuit groups processes signals of the next read row within an average period of (M/N)H, and thus receives and processes signals output from the N read rows sequentially read by the scanning of the driving circuit.

In the physical quantity detecting device according to the above-mentioned embodiment, the driving circuit can scan, as the read rows, N rows of pixels in the pixel array at the same time and read out signals corresponding to N types of different storage times of the read rows. In addition, when a scanning unit period is 1H, the driving circuit can process signals of the next read row within an average period of (M/N)H of each of the signal processing circuit groups, and thus M signal processing circuit groups whose number is smaller than the number of read rows, N, can process signals of the N read rows. Further, the driving circuit scans the N read rows at the timings having a substantially equal interval, and the M signal processing circuit groups process the signals within operational periods in synchronization with the timings, which makes it possible to perform processing with high symmetry and a high degree of efficiency.

According to an embodiment of the invention, M signal processing circuit groups whose number is smaller than the number of read rows, N, can process signals of the N read rows. Therefore, it is possible to synthesize three or more signals having different storage times to obtain a wide dynamic range and to perform signal processing on one column of pixels with a small number of column circuits.

DESCRIPTION OF THE PREFERRED EMBODIMENTS

Hereinafter, preferred embodiments of the invention will be described with reference to the accompanying drawings.

In the invention, a solid-state imaging device for detecting the intensity of light incident via a subject is given as an example of a physical quantity detecting device for detecting a physical quantity given from the outside.

Figure 1:
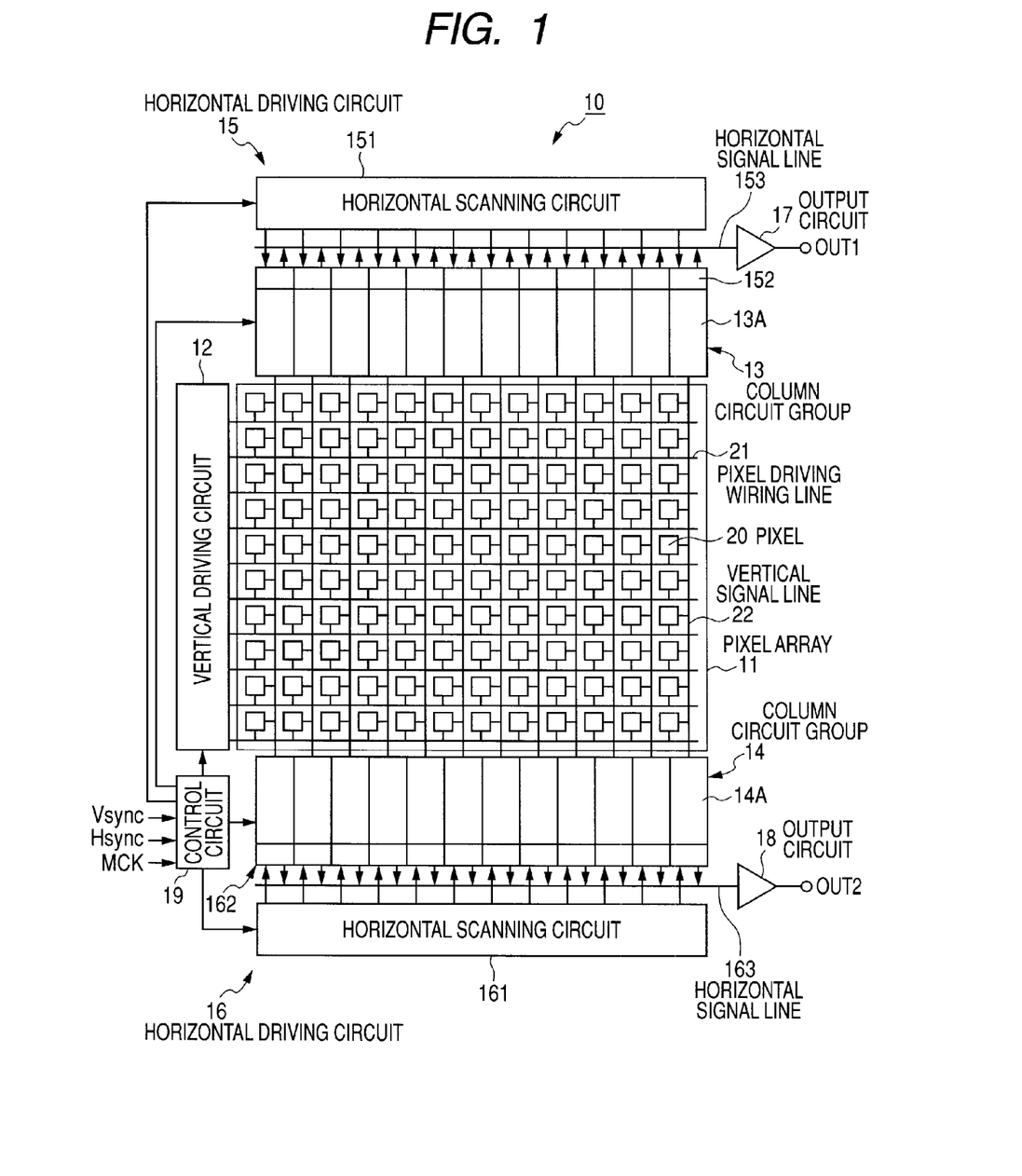
FIG. 1 is a diagram illustrating the structure of a solid-state imaging device according to an embodiment of the invention.

FIG. 1 is a diagram schematically illustrating the structure of a solid-state imaging device according to an embodiment of the invention. In this embodiment, a CMOS (complementary metal oxide semiconductor) image sensor is given as an example of the solid-state imaging device.

As shown in FIG. 1, a solid-state imaging device 10 according to this embodiment includes a pixel array 11, a vertical driving circuit 12, M column circuit (column parallel signal processing circuit) groups 13 and 14 (in this embodiment, M=2), horizontal driving circuits 15 and 16, output circuits 17 and 18, and a control unit 19.

In the pixel array 11, a plurality of pixels 20 each having a photoelectric converter for converting incident light into an electric signal having a charge corresponding to the intensity of the incident light (a physical quantity supplied from the outside) are two-dimensionally arranged in a matrix. The detailed circuit structure of the pixel 20 will be described later. In the pixel array 11, a pixel driving wiring line 21 is provided for each row of pixels among the pixels arranged in a matrix, and a vertical signal line 22 is provided for each column of pixels.

The vertical driving circuit 12 is formed of, for example, a shift register or a decoder. The vertical driving circuit 12 sequentially and selectively scans rows of pixels 20 in the pixel array 11, and supplies a necessary driving pulse (control pulse) to the selected row of pixels through the pixel driving wiring line 21.

In this embodiment, although not shown in the drawings, the vertical driving circuit 12 includes a read scanning system for performing a read operation of sequentially selecting rows of pixels 20 and reading signals of the selected row of pixels 20 and an electronic shutter scanning system for performing an electronic shutter operation of removing (resetting) the charge stored in the photoelectric converters of the same row of pixels 20 for a time corresponding to a shutter speed before the read scanning by the read scanning system.

The storage time (exposure time) of a signal charge in the pixel 20 depends on a read scanning interval by the read scanning system. However, when an unnecessary charge of the photoelectric converter is reset by the shutter scanning of the electronic shutter scanning system after the read scanning by the read scanning system, a period from that timing to the timing when the signals of the pixels 20 are read by the next read scanning by the read scanning system is the signal charge storage time of the pixel 20. That is, the electronic shutter operation means an operation of resetting the signal charge stored in the photoelectric converter and starting to store a new signal charge.

The signals output from the selected row of pixels 20 are supplied to the column circuit group 13 or the column circuit group 14 through the vertical signal lines 22. The column circuit groups 13 and 14 have column circuits 13A and 14A provided so as to have a one-to-one correspondence with columns of pixels in the pixel array 11, respectively, and the column circuits 13A and 14A are provided above and below the pixel array 11, respectively. The column circuit group 13 or 14 receives the signals output from each row of pixels 20 through the vertical signal lines and performs amplification or correlated double sampling (CDS) on the received signals to remove a fixed pattern noise peculiar to the pixels. Each of the column circuits 13A and 14A of the column circuit groups 13 and 14 may have an A/D (analog-to-digital) converting function.

The horizontal driving circuits 15 and 16 are provided as so to correspond to the column circuit groups 13 and 14, respectively. The horizontal driving circuit 15 includes a horizontal scanning circuit 151, a horizontal selecting switch group 152, and a horizontal signal line 153. The horizontal scanning circuit 151 is composed of a shift register. The horizontal scanning circuit 151 sequentially selects switches of the horizontal selecting switch group 152 and sequentially outputs to the horizontal signal line 153 the signals corresponding to one row of pixels that have been processed by the column circuits 13A of the column circuit group 13.

Similar to the horizontal driving circuit 15, the horizontal driving circuit 16 also includes a horizontal scanning circuit 161, a horizontal selecting switch group 162, and a horizontal signal line 163. The horizontal scanning circuit 161 sequentially selects switches of the horizontal selecting switch group 162 by horizontal scanning and sequentially outputs to the horizontal signal line 163 the signals corresponding to one row of pixels that have been processed by the column circuits 14A of the column circuit group 14.

The output circuits 17 and 18 perform various signal processes on the signals sequentially supplied from the column circuits 13A and 14A of the column circuit groups 13 and 14 through the horizontal selecting switch groups 152 and 162 and the horizontal signal lines 153 and 163, respectively, and output the processed signals as output signals OUT1 and OUT2, respectively. The output circuits 17 and 18 may perform only a buffering process, or it may perform, for example, a process of adjusting a black level, a process of correcting the deviation between columns of pixels, a process of amplifying signals, and a process related to colors before the buffering process.

The control circuit 19 receives data indicating the operational mode of the solid-state imaging device 10 through an interface (not shown), and outputs data including information of the solid-state imaging device 10 to the outside. In addition, the control circuit 19 generates a clock signal or a control signal for controlling the operation of the vertical driving circuit 12, the column circuit groups 13 and 14, and the horizontal driving circuits 15 and 16 on the basis of a vertical synchronization signal VsyNc, a horizontal synchronization signal HsyNc, and a master clock signal MCK, and supplies the signal to each circuit.

Pixel Circuit

Figure 2:
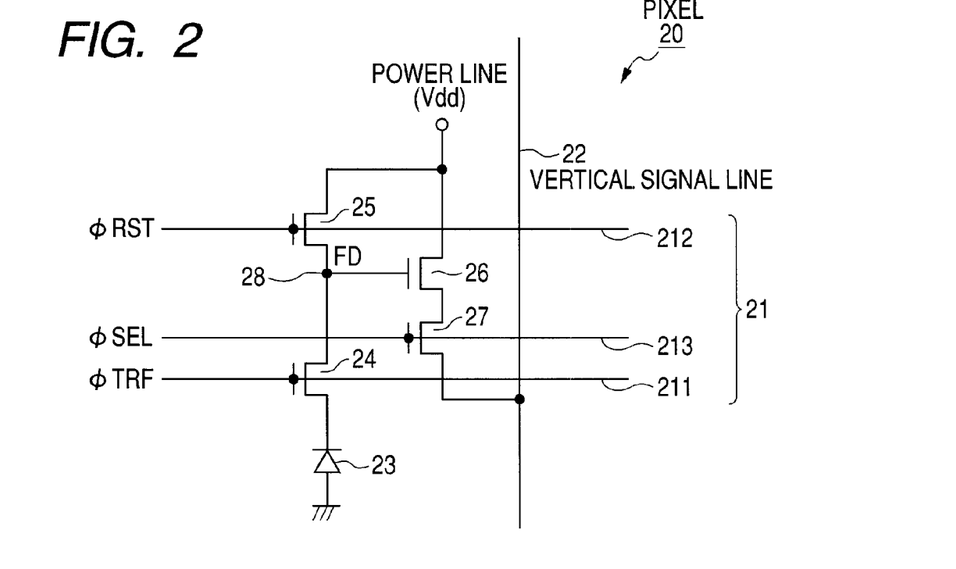
FIG. 2 is a circuit diagram illustrating the circuit structure of a pixel of the solid-state imaging device.

FIG. 2 is a circuit diagram illustrating the circuit structure of the pixel 20.

As shown in FIG. 2, the pixel 20 according to this circuit example has a pixel circuit includes a photodiode 23, serving as a photoelectric converter, and four transistors, such as a transfer transistor 24, a reset transistor 25, an amplifying transistor 26, and a selecting transistor 27. In this embodiment, N-channel MOS transistors are used as the four transistors 24 to 27. The pixel driving wiring line 21 including a transmission wiring line 211, a reset wiring line 212, and a selection wiring line 213 is provided for each row of pixels 20.

In FIG. 2, the photodiode 23 converts incident light into a charge (in this embodiment, an electron) corresponding to the intensity of the incident light. A cathode of the photodiode 23 is electrically connected to a gate of the amplifying transistor 26 through the transfer transistor 24. A node electrically connected to the gate of the amplifying transistor 26 is called an FD (floating diffusion) portion 28. The FD portion 28 converts the charge into a voltage.

The transfer transistor 24 is connected between the cathode of the photodiode 23 and the FD portion 28, and is turned on when a transmission pulse $\phi$TRF is supplied to the gate thereof through the transmission wiring line 211, which causes the optical charge that has been subjected to photoelectric conversion by the photodiode 23 and then stored in the photodiode 23 to be transmitted to the FD portion 28.

The reset transistor 25 has a drain connected to a power line of the power supply voltage Vdd, a source connected to the FD portion 28, and a gate connected to the reset wiring line 212. When a reset pulse $\phi$RST is supplied to the gate of the reset transistor 25, the reset transistor 25 is turned on, which causes the charge of the FD portion 28 to be transmitted to the power line of the power supply voltage (Vdd) before the signal charge is transmitted from the photodiode 23 to the FD portion 28, thereby resetting the FD portion 28.

The amplifying transistor 26 has a gate connected to the FD portion 28 and a drain connected to the power line of the power supply voltage Vdd. The amplifying transistor 26 outputs the potential of the FD portion 28 reset by the reset transistor 25 as a reset level and also outputs, as a signal level, the potential of the FD portion 28 after the signal charge is transmitted from the photodiode 23 by the transfer transistor 24.

For example, the selecting transistor 27 has a drain connected to the source of the amplifying transistor 26, a source connected to the vertical signal line 22, and a gate connected to the selection wiring line 213. The selecting transistor 27 is turned on when a selection pulse $\phi$SEL is supplied to the gate thereof through the selection wiring line 213, which causes the pixel 20 to be in a selected state. As a result, the signal amplified by the amplifying transistor 26 is output to the vertical signal line 22.

The selecting transistor 27 may be connected to the drain of the amplifying transistor 26 and the power line of the power supply voltage Vdd.

In this embodiment, the pixel 20 has the four transistors, but the invention is not limited thereto. For example, the pixel 20 may have three transistors including a transistor serving as both the amplifying transistor 26 and the selecting transistor 27.

The solid-state imaging device 10 having the above-mentioned structure according to this embodiment is characterized by the scanning of the vertical driving circuit 12 and the operation of the column circuit groups 13 and 14 with respect to the pixel array 11 when three or more signals having different signal charge storage times in the pixel 20 are synthesized to obtain a wide dynamic range.

Figure 3:
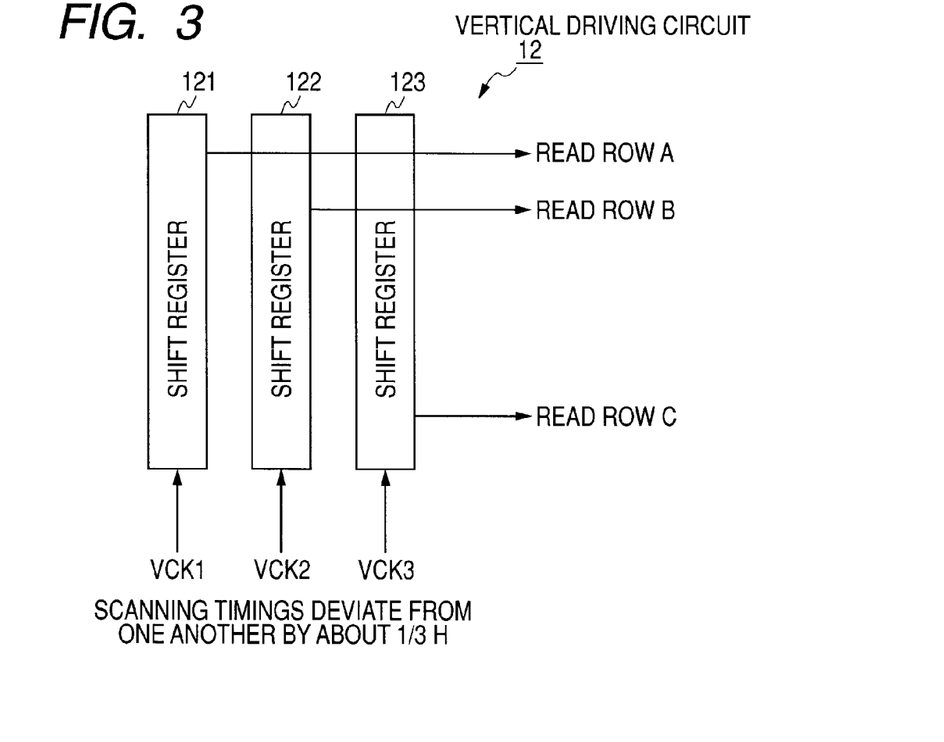
FIG. 3 is a block diagram illustrating an example of the structure of a vertical driving circuit.

In order to obtain N signals (N is an integer equal to or larger than 3; in this embodiment, N=3) having different signal charge storage times, that is, different sensitivities, the vertical driving circuit 12 scans three read rows at the same time. FIG. 3 shows an example of the structure of the vertical driving circuit 12 for performing the scanning.

FIG. 3 shows a read scanning system that performs a read operation for reading signals of a selected row of pixels 20. The electronic shutter scanning system basically has the same structure as the read scanning system.

When sequentially scanning three rows of pixels of the pixel array 11 to obtain three signals having different sensitivities, the read scanning system of the vertical driving circuit 12 includes, for example, three shift registers 121, 122, and 123, and vertical clock pulses VCK1, VCK2, and VCK3 which deviate from one another by about ⅓ H (H is a scanning unit period) are supplied to the three shift registers 121, 122, and 123, respectively.

As described above, if the vertical clock pulses VCK1, VCK2, and VCK3 which deviate from one another by about ⅓ H are supplied to the three shift registers 121, 122, and 123, respectively, at the time when three rows of pixels of the pixel array 11 are sequentially scanned, the scanning of three read rows is performed in a period of 1H, but the scanning timings for the three read rows deviate from one another by about ⅓ H.

Figure 4A:
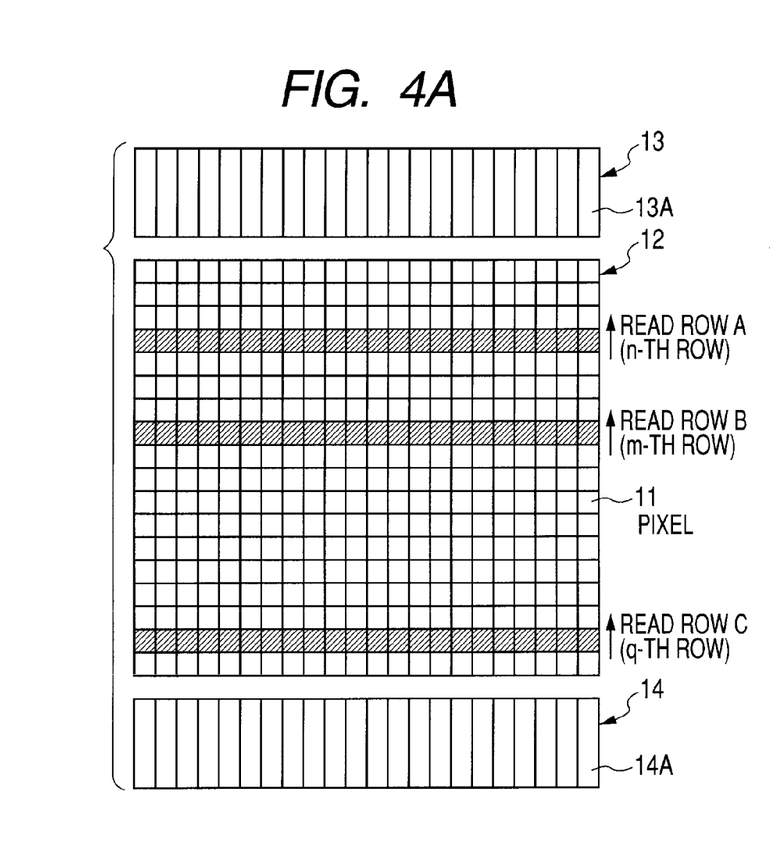
FIGS. 4A and 4B are conceptual diagrams illustrating scanning by the vertical driving circuit.
Figure 4B:
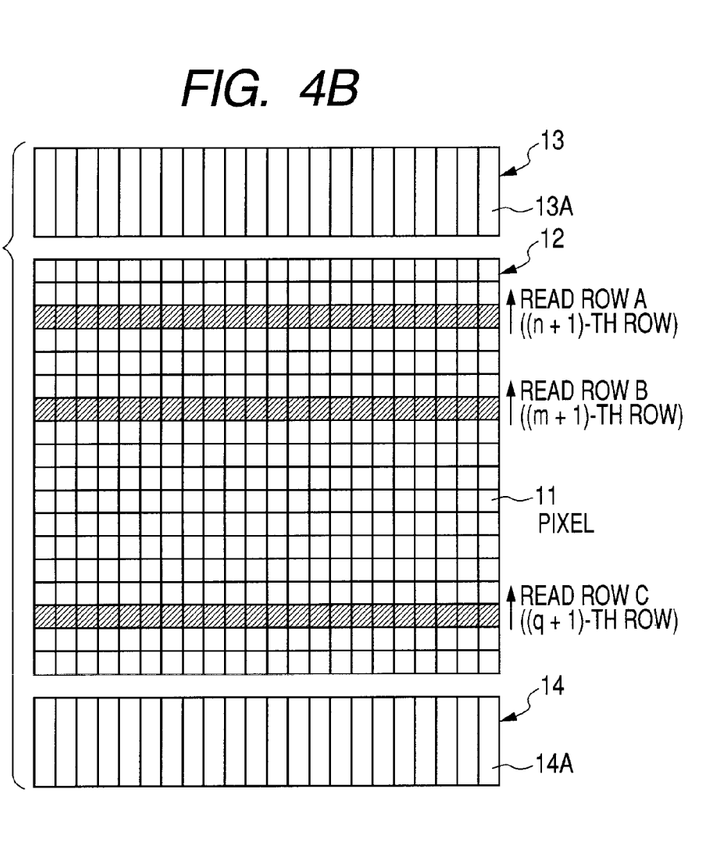

FIGS. 4A and 4B show the scanning of the vertical driving circuit 12 with respect to rows of pixels. The vertical driving circuit 12 scans three rows, that is, an n-th row, an m-th row, and a q-th row, as read rows A, B, and c at the same time (FIG. 4A). After the period of 1H, an (n+1)-th row, an (m+1)-th row, and a (q+1)-th row are scanned as the three read rows A, B, and C at the same time (FIG. 4B).

Figure 5:
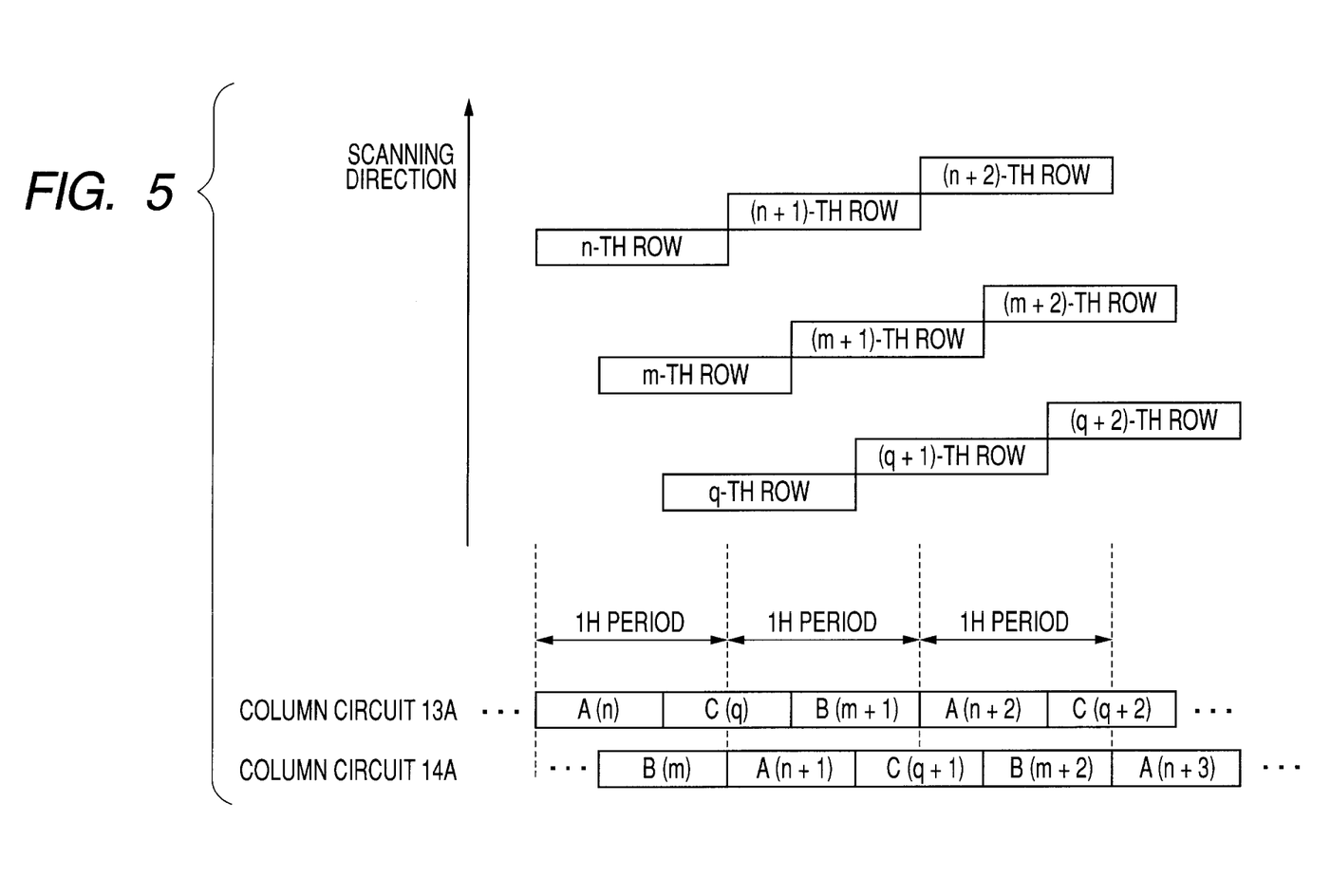
FIG. 5 is a diagram illustrating the correspondence between column circuits and rows of pixels to be scanned (part 1)
Figure 6:
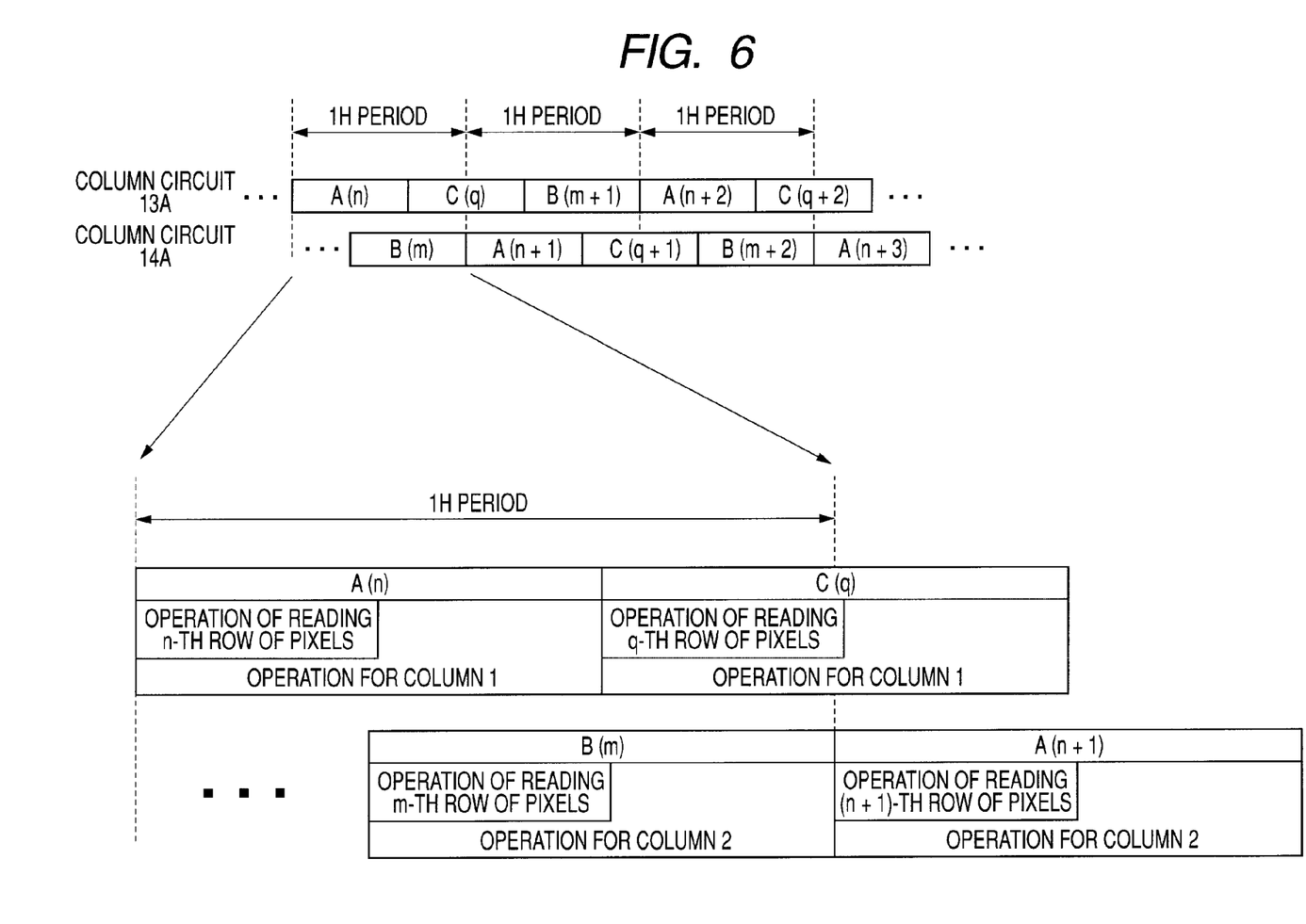
FIG. 6 is a diagram illustrating the correspondence between column circuits and rows of pixels to be scanned (part 2)

FIGS. 5 and 6 show the correspondence between rows to be scanned and each column circuit 13A (14A) of the column circuit group 13 (14). In FIGS. 5 and 6, for example, A(n) indicates that an n-th row is scanned as the read row A and the column circuit processes or holds the signal of the row (when the column circuit is a pipeline type, the initial state thereof is considered). The scanning of the read rows A, B, and C by the vertical driving circuit is performed within a period of 1H, but the scanning timings therefore deviate from one another by about ⅓ H.

First, an n-th row is scanned as the read row A and an n-th selection wiring line 213 (see FIG. 2) is driven to select an n-th row of pixels. Then, an n-th transmission wiring line 211 or an n-th reset wiring line 212 (see FIG. 2) is driven to read out signals of the pixels in an n-th read row A. The signals of the pixels in the read row A are transmitted to column circuits of one of the column circuit groups 13 and 14, for example, to the column circuits 13A of the column circuit group 13, and are then processed by the column circuits 13A. During the signal processing, the reading of the signals from the n-th row is terminated, and the n-th selection wiring line 213 is driven to disconnect the n-th row of pixels from the vertical signal line 22.

Next, an m-th row is scanned as the read row B and an m-th selection wiring line 213 is driven to select an m-th row of pixels. Then, an m-th transmission wiring line 211 or an m-th reset wiring line 212 is driven to read out signals of the pixels in an m-th read row B. The signals of the pixels in the read row B are transmitted to the column circuits 14A of the column circuit group 14, and are then processed by the column circuits 14A. During the signal processing, the reading of the signals from the m-th row is terminated, and the m-th selection wiring line 213 is driven to disconnect the m-th row of pixels from the vertical signal line 22.

Then, the operation of the column circuits 13A with respect to the n-th row of pixels is terminated, a q-th row is scanned as the read row C, and a q-th selection wiring line 213 is driven to select a q-th row of pixels. Then, a q-th transmission wiring line 211 or a q-th reset wiring line 212 is driven to read out signals of the pixels in a q-th read row C. The signals of the pixels in the read row C are transmitted to the column circuits 13A of the column circuit group 13, and are then processed by the column circuits 13A. During the signal processing, the reading of the signals from the q-th row is terminated, and the q-th selection wiring line 213 is driven to disconnect the q-th row of pixels from the vertical signal line 22.

Next, the operation of the column circuits 14A with respect to the m-th row of pixels is terminated, an (n+1)-th row is scanned as the read row A, and an (n+1)-th selection wiring line 213 is driven to select an (n+1)-th row of pixels. Then, an (n+1)-th transmission wiring line 211 or an (n+1)-th reset wiring line 212 is driven to read out signals of the pixels in an (n+1)-th read row A. The signals of the pixels in the read row A are transmitted to the column circuits 14A of the column circuit group 14, and are then processed by the column circuits 14A.

Similarly, the signals of the pixels in an (m+1)-th read row B are processed by the column circuits 13A of the column circuit group 13. The signals of the pixels in a (q+1)-th read row C are processed by the column circuits 14A of the column circuit group 14. The signals of the pixels in an (n+2)-th read row A are processed by the column circuits 13A of the column circuit group 13. The signals of the pixels in an (m+2)-th read row B are processed by the column circuits 14A of the column circuit group 14. The signals of the pixels in a (q+2)-th read row C are processed by the column circuits 13A of the column circuit group 13. In this way, the signals of the pixels in the read rows A, B, and C are alternately processed by the column circuit groups 13 and 14.

The three pixel signals having different storage times, that is, different sensitivities, of the read rows A, B, and C which are alternately processed by the column circuit groups 13 and 14 are sequentially read out from the read rows A, B, and C by the horizontal scanning of the horizontal scanning circuit 161 and are then synthesized in a subsequent signal processing system. When the three signals having different sensitivities are synthesized, it is possible to obtain a wider dynamic range, as compared with when two signals having different sensitivities are synthesized.

The operation of one column circuit, that is, the operation of each of the column circuits 13A and 14A is performed within an average period of ⅔ H, not within a period of 1H, which is the unit of scanning. That is, M column circuits 13A and 14A (in this embodiment, M=2) provided for each column of pixels of the pixel array 11 are sequentially operated within an average period of ⅔ H. The M column circuits 13A and 14A sequentially receive signals output from three pixels of the columns of pixels corresponding to three read rows A, B, and C that are sequentially read by the scanning of the vertical driving circuit 13 and process the received signals. The column circuits 13A and 14A may perform signals of the next row of pixels within an average period of ⅔ H, not within an exact period of ⅔ H, due to the inconsistency of a clock or the insertion of a short additional process. As the column circuits operate within a period closer to the period of ⅔ H, symmetry is improved, which is preferable.

The column circuits 13A and 14A process signals within operational periods having substantially the same interval, particularly, within operational periods in synchronization with the scanning timings of the read rows A, B, and C. A period for which the pixels 20 are connected to the column circuits 13A and 14A is limited to the first half of each of the operational periods of the column circuits 13A and 14A. During the second half of the operational periods of the column circuits 13A and 14A, each of the column circuits 13A and 14A outputs signals to the horizontal signal line. Alternatively, in the pipeline type, the column circuits transmit signals to the next stage and prepare to receive the next signal.

The column circuit according to the related art processes signals of the next row of pixels for each period of 1H in synchronization with the scanning of the pixel array 11. However, in this embodiment of the invention, as described above, the column circuits 13A and 14A process signals of the next row of pixels within an average period of ⅔ H, not within a period of 1H. Therefore, although the two column circuits 13A and 14A are provided for one row of pixels, the two column circuits 13A and 14A can process three signals read out from the pixel of the read rows A, B, and C.

The operational periods of the column circuits 13A and 14A have a substantially equal interval, and thus the waiting periods of the two column circuits 13A and 14A are equal to each other, that is, the operations of the two column circuits 13A and 14A are symmetric, which makes it possible to reduce the difference between characteristics of the column circuits 13A and 14A. In addition, while one of the column circuits 13A and 14A is receiving the signals of the pixels, the other column circuit processes signals, which makes it possible to effectively use time and thus to increase the operating speed.

In the appended claims, the term 'equal interval' includes a case in which two operational periods have the same interval and a case in which two operational periods deviate from each other in the range of −10% to +10%. For example, it is possible to obtain the above-mentioned effects when the deviation between two operational periods is very small or the deviation therebetween is in the range of −10% to +10%.

Figure 7:
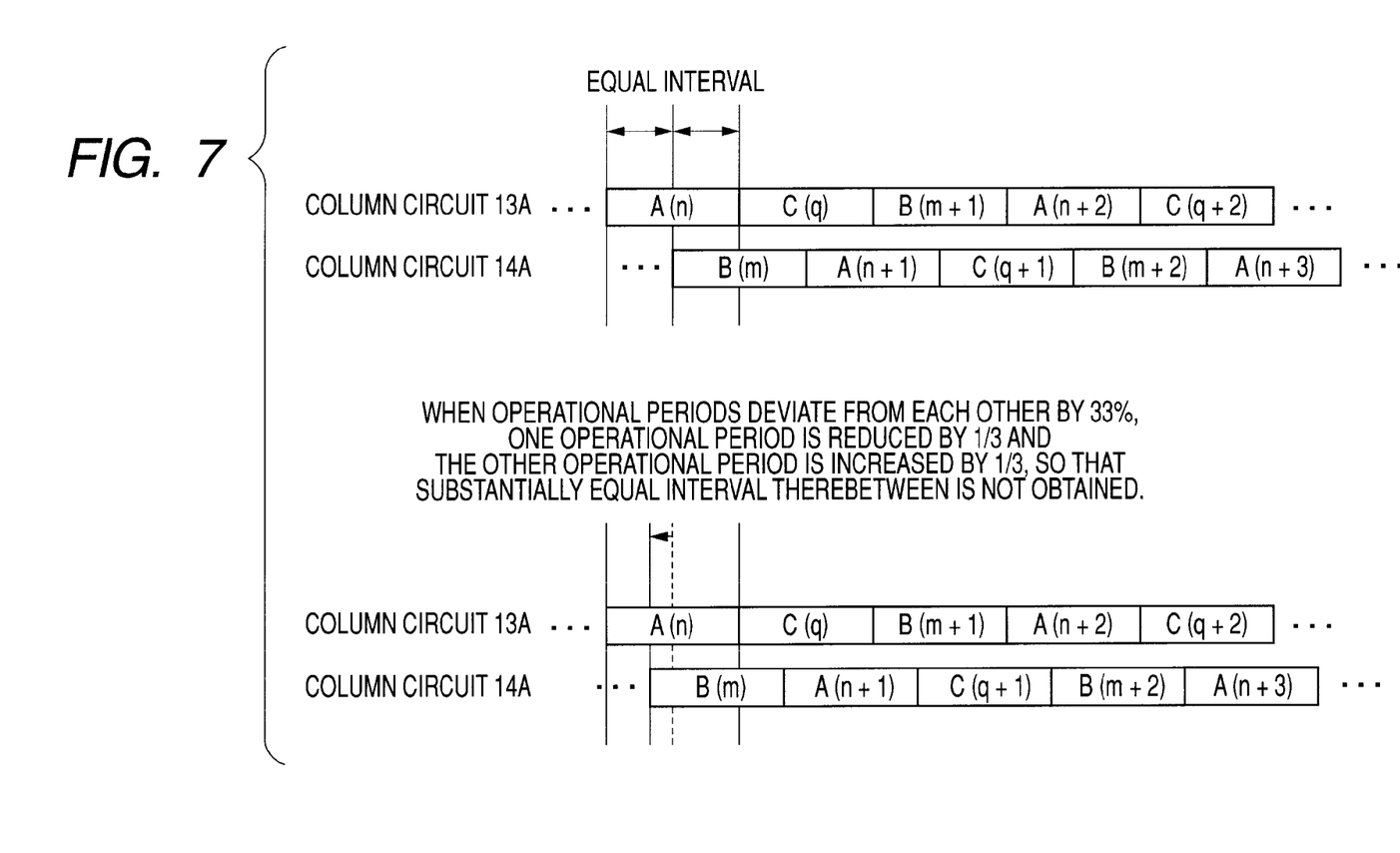
FIG. 7 is a diagram illustrating the operation of a plurality of column circuits with operational periods thereof having a substantially equal interval.

In addition, the deviation between the two operational periods is not limited to the range of −10% to +10%. For example, it is possible to obtain the same effects as described above when the column circuits process signals within the operational periods which deviate from each other in the range of −33% to +33%. For example, as shown in FIG. 7, although the operational periods deviate from each other in the range of −33% to +33%, little asymmetry occurs, which makes it possible to obtain similar effects to the above to some extent.

The effects by little deviation between the operational periods of the column circuits 13A and 14A can be obtained from all the physical quantity detecting devices for processing signals read out from the pixels of the pixel array 11 using a plurality of column circuit groups as well as the solid-state imaging device 10 according to this embodiment.

Figure 8:
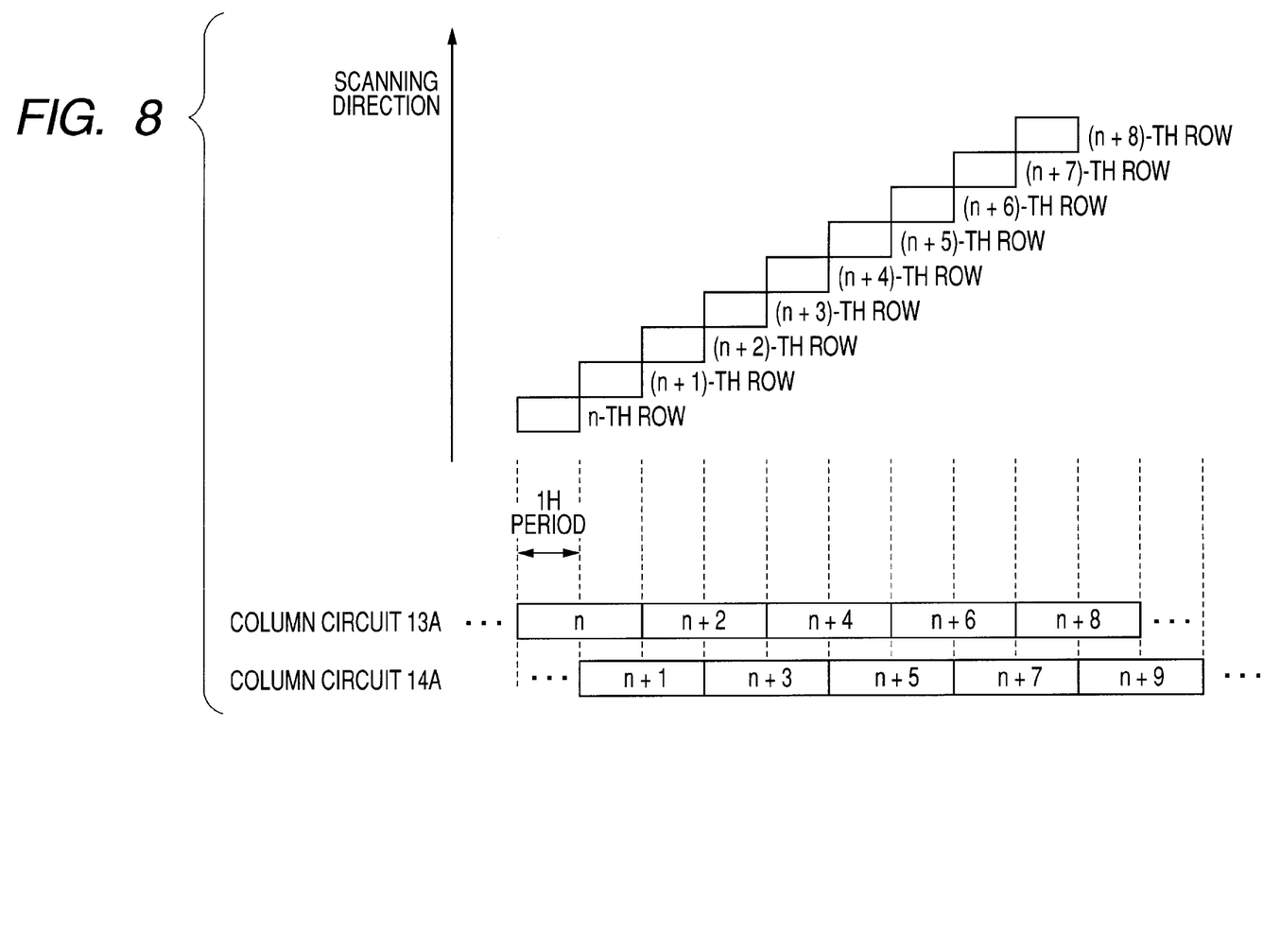
FIG. 8 is a diagram illustrating the correspondence between column circuits and rows of pixels to be scanned when one read row is scanned.

For example, as shown in FIG. 8, it is considered that, when one read row is scanned, the column circuits 13A and 14A sequentially process signals in the above-mentioned structure. For example, when the processing times of the column circuits 13A and 14A are longer than a pixel read time, it is possible to effectively use time and thus to increase the operating speed. In addition, since the operations of the column circuits 13A and 14A are symmetric, it is possible to reduce the difference between characteristics of the column circuits 13A and 14A.

In this embodiment, the two column circuits 13A and 14A for processing the signals of the pixels of the three read rows A, B, C are provided above and below each column of pixels. Therefore, unlike a structure in which both the column circuits 13A and 14A are provided at the upper or lower side of the pixel array so as to overlap each other in the vertical direction (see FIG. 14), it is unnecessary to provide the vertical signal line 22 so as to pass through the other column circuit, and thus it is possible to prevent complicated wiring and noise generation. Thus, the structure according to this embodiment is most preferable.

That is, the two column circuit groups 13 and 14 process signals of pixels of a larger number of read rows, and two column circuits 13A and 14A process three or more signals having different storage times. Therefore, it is possible to increase the number of signals to be processed and to improve accuracy during a dynamic expansion process. In addition, it is possible to reduce the cost of a chip, as compared with a structure in which three or more column circuit groups are provided. Further, it is possible to cope with reduction in the size of a pixel and to reduce noise.

However, the number of read rows to be scanned is not limited to three. For example, four or more read rows may be used. In addition, the number of column circuit groups is not limited to two. For example, three or more column circuit groups may be used.

When three or more column circuit groups are used, the column circuit groups are provided at the same side of the pixel array so as to overlap each other in the vertical direction. In this case, when N rows of pixels (N is an integer equal to or larger than 3) of the pixel array 11 are scanned, M column circuits (1<M<N) provided for each column of pixels process signals of pixels of the next read row within an average period of (M/N)H. In this way, the column circuits receive and process the signals sequentially read out from N read rows by the scanning of the vertical driving circuit 12. Thus, the column circuit groups whose number is smaller than the number of read rows can process signals of pixels.

Appropriate electronic shutter rows may be set among the read rows A, B, and C, and shutter scanning may be performed thereon, thereby performing an electronic shutter operation. Of course, the invention can be similarly applied to solid-state imaging devices not using the electronic shutter.

During the period of 1H, the electronic shutter row can be operated for a short time immediately before or immediately after the pixel read operation of the read rows A, B, and C. In addition, a period for an electronic shutter may be independently set, and the scanning timing or the switching timing of the operation of the column circuit may be delayed from a period of 1H by the time required for the electronic shutter, not by a period of ⅓ H, so that the timing may deviate from the period of 1H by ⅓. For reasons of the electronic shutter or timing adjustment, the scanning timing or the switching timing of the operation of the column circuit may deviate from the period of 1H by periods other than the period of ⅓ H.

Figure 9:
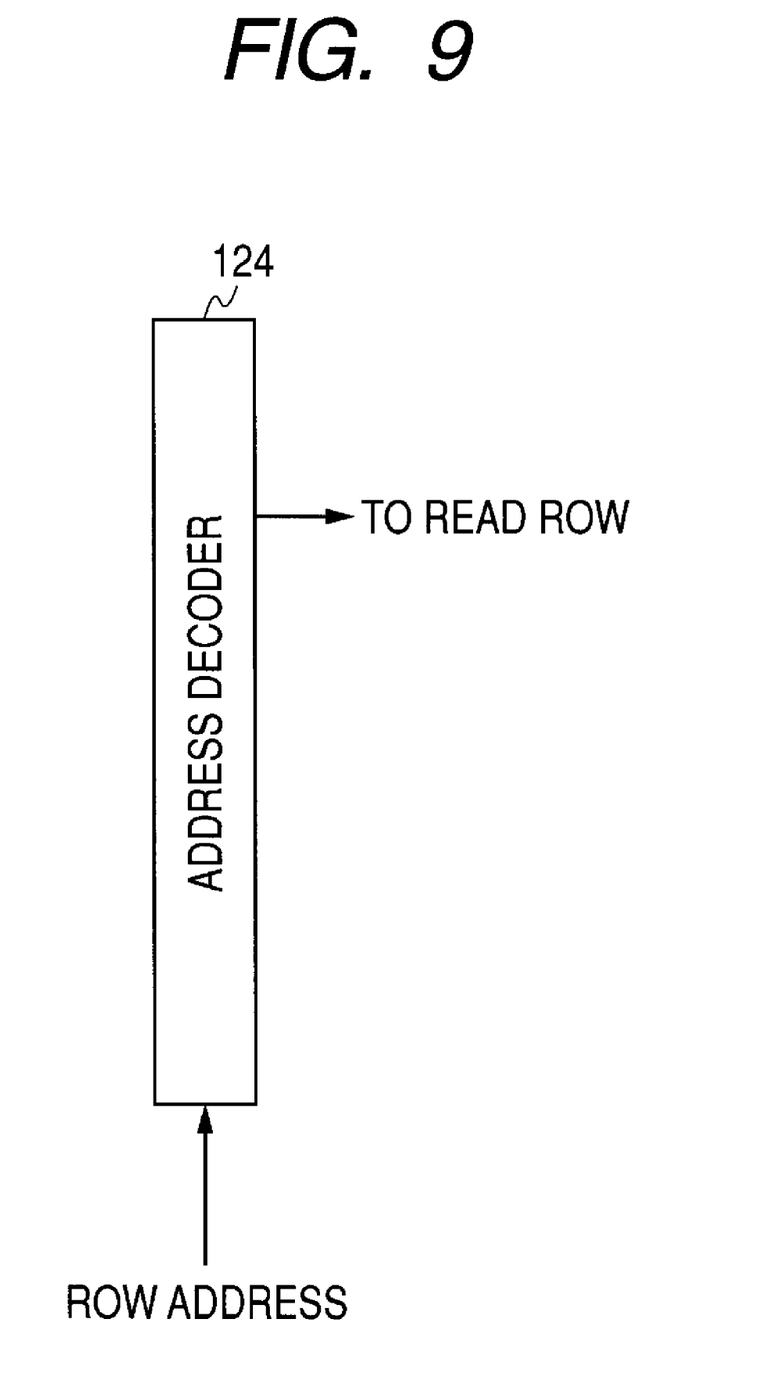
FIG. 9 is a block diagram illustrating another example of the structure of the vertical driving circuit.
Figure 10:
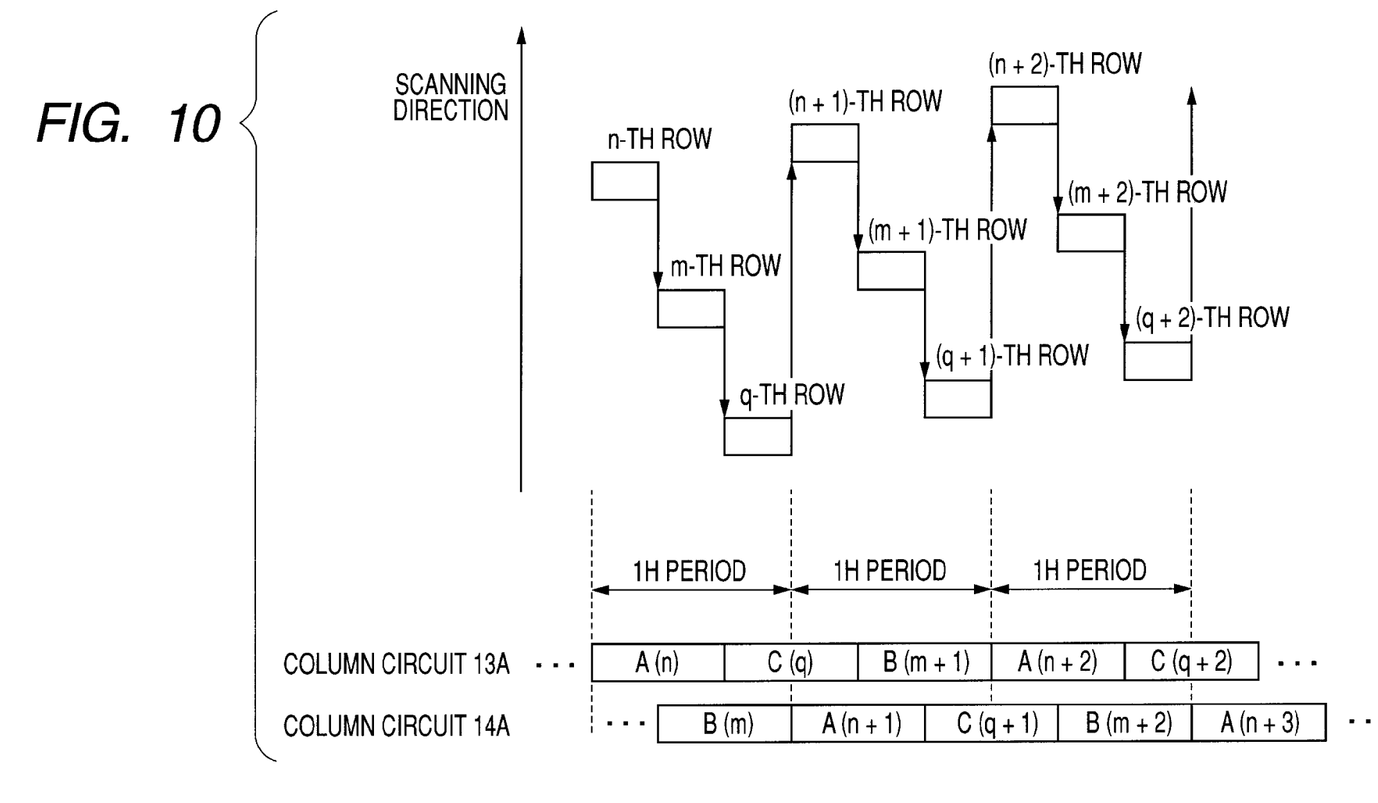
FIG. 10 is a diagram illustrating the correspondence between column circuits and rows of pixels to be scanned when a read scanning system includes one address decoder.

In this embodiment, the shift registers 121 to 123 (see FIG. 3) are used as the read scanning system of the vertical driving circuit 12, but the invention is not limited thereto. As a modification, an address decoder may be used instead of the shift registers 121 to 123. When the address decoder selects a row of pixels, the read scanning system may be composed of one address decoder 124, as shown in FIG. 9. In this case, the control circuit 19 shown in FIG. 1 appropriately generates a row address and then supplies the row address to the address decoder 124. The row address is generated as shown in FIG. 10, instead of the operation shown in FIG. 5. The operation shown in FIG. 6 does not vary. In this way, a corresponding row of pixels is reliably selected in a period for which a pixel read operation is performed. Other rows of pixels can be selected in periods other than the period for which the pixel read operation is performed. Therefore, when a period for which an electronic shutter row is driven does not overlap the period for which the pixel read operation is performed, an electronic shutter scanning system can also use the address decoder 124.

In the above-described embodiment, the column circuits 13A and 14A of the column circuit groups 13 and 14 are arranged so as to have a one-to-one correspondence with one column of pixels, but the invention is not limited thereto. For example, the column circuits 13A and 14A may be arranged so as to correspond to a plurality of columns of pixels and may be used in a time division manner. In this structure, when the plurality of columns of pixels shared by the column circuits 13A and 14A are completely processed and the next row of pixels is scanned, the same operation as described can be performed.

In the above-described embodiment, three rows of pixels being scanned at the same time have different storage times. However, when the dynamic range is extended three times or in order to obtain three signals of close time for a certain object, the three rows of pixels do not necessarily have different storage times. Basically, the invention can be applied to all structures in which a plurality of column circuits are provided for each column of pixels and rows of pixels whose number is larger than the number of column circuits are scanned at the same time.

In the above-described embodiment, the solid-state imaging device for detecting the intensity of light incident via a subject is used as a physical quantity detecting device for detecting a physical quantity supplied from the outside, but the invention is not limited to the solid-state imaging device. For example, the physical quantity detecting device may be a fingerprint detecting device (capacitance detecting device) for detecting capacitance formed to correspond to a fingerprint between a detecting electrode and the surface of a finger or a detecting device for detecting pressure or the distribution of a chemical material as a physical quantity supplied from the outside. In addition, the invention may be applied to all physical quantity detecting devices including a detecting unit for detecting a physical quantity supplied from the outside and pixels two-dimensionally arranged in a matrix, each having a selecting transistor for selectively outputting a signal from the detecting unit to a signal line.

Applications

The solid-state imaging device 10 according to the above-described embodiment is preferably used as an imaging device (image input device) of an imaging apparatus, such as a digital still camera or a video camera.

The imaging apparatus means a camera module (for example, a camera module mounted on an electronic apparatus, such as a cellular phone) including a solid-state imaging device, serving as an imaging device, an optical system for forming an optical image of a subject on an imaging surface (light receiving surface) of the solid-state imaging device, and a circuit for processing signals of the solid-state imaging device and a camera system including the camera module, such as a digital still camera or a video camera.

Figure 11:
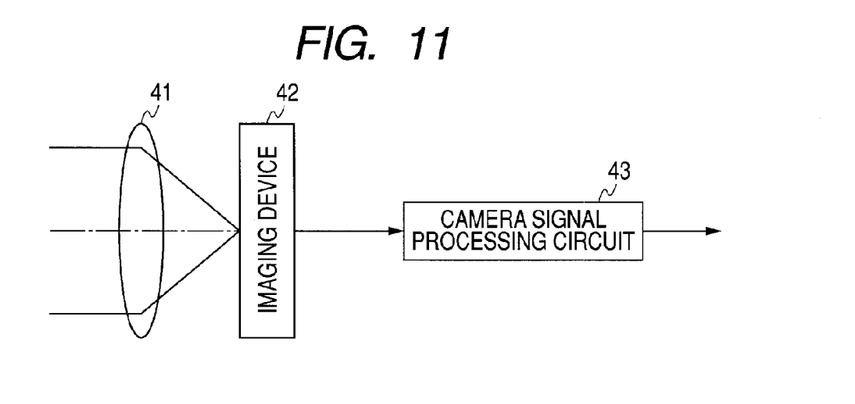
FIG. 11 is a block diagram illustrating an example of the structure of an imaging apparatus according to another embodiment of the invention.

FIG. 11 is a block diagram illustrating an example of the structure of an imaging apparatus according to another embodiment of the invention. As shown in FIG. 11, the imaging apparatus according to this embodiment of the invention includes an optical system having a lens 41, an imaging device 42, and a camera signal processing circuit 43.

The lens 41 focuses an optical image from a subject on the imaging surface of the imaging device 42. The imaging device 42 outputs image signals obtained by converting the optical image formed on the imaging surface by the lens 41 into electric signals in the units of pixels. The solid-state imaging device 10 according to the above-described embodiment is used as the imaging device 42. The camera signal processing unit 43 performs various signal processes on the image signals output from the imaging device 42.

As described above, in the imaging apparatuses, such as a video camera, an electronic still camera, and a camera module provided in a mobile apparatus, such as a cellular phone, the solid-state imaging device 10 according to the above-described embodiment is used as the imaging device 42, which makes it possible to obtain the following effects.

That is, in the solid-state imaging device 10 according to the above-described embodiment, three or more signals having different storage times are synthesized, which makes it possible to obtain a wider dynamic range. Therefore, it is possible to further improve the quality of a captured image. In addition, a small number of column circuits can be provided for one column of pixels to process signals by synthesizing three or more signals having different storage times to obtain a wider dynamic range. As a result, it is possible to reduce the size of a chip and the cost of the chip, and thus to reduce the size of an imaging apparatus and manufacturing costs thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A physical quantity detecting device comprising:
   a pixel array that has pixels two-dimensionally arranged in a matrix, each converting a physical quantity supplied from the outside into an electric signal;
   a driving circuit that scans, as read rows, N rows of pixels (N being an integer equal to or larger than 3) in the pixel array at the same time and reads out signals corresponding to the pixels in the read rows; and
   M signal processing circuit groups (1<M<N) each of which has M column circuits provided for each column of pixels of the pixel array, sequentially receives and processes signals output from the read rows, and when a scanning unit period is H, processes signals of the next read row within an average period of(M/N)H.

2. The physical quantity detecting device according to claim 1,
   wherein the driving circuit scans the N read rows at the timings having an equal interval.

3. The physical quantity detecting device according to claim 1,
   wherein the M signal processing circuit groups receive the signals alternately supplied from the N read rows and process the signals within operational periods having an equal interval.

4. The physical quantity detecting device according to claim 1,
   wherein the M signal processing circuit groups receive the signals alternately supplied from the N read rows and process the signals within operational periods that deviate from each other by in a range of −33% to +33%.

5. The physical quantity detecting device according to claim 1,
   wherein the driving circuit scans the N read rows at the timings having a substantially equal interval, and
   the M signal processing circuit groups receive the signals alternately supplied from the N read rows and process the signals within operational periods in synchronization with scanning timings of the N read rows.

6. The physical quantity detecting device according to claim 1,
wherein M is two, and
the two signal processing circuit groups are provided at both sides of the pixel array.

7. A method of driving a physical quantity detecting device including a pixel array that has pixels two-dimensionally arranged in a matrix, each converting a physical quantity supplied from the outside into an electric signal, a driving circuit that scans, as read rows, N rows of pixels (N ) being an integer equal to or larger than 3) in the pixel array at the same time and reads out signals corresponding to the pixels in the read rows, and M signal processing circuit groups (1<M<N) each having M column circuits provided for each column of pixels of the pixel array, the method comprising the step of:
when a scanning unit period is H, sequentially operating the M signal processing circuit groups within an average period of (M/N)H to process signals sequentially read from N read rows by the scanning of the driving circuit.

8. An imaging apparatus comprising:
a solid-state imaging device that includes a pixel array having pixels two-dimensionally arranged in a matrix, each including a photoelectric converter that converts incident light from the outside into a signal charge; and
an optical system that guides light from a subject onto an imaging surface of the solid-state imaging device;
wherein the solid-state imaging device includes:
a driving circuit that scans, as read rows, N rows of pixels (N being an integer equal to or larger than 3) in the pixel array at the same time and reads out signals corresponding to the pixels in the read rows; and
M signal processing circuit groups (1<M<N) each of which has M column circuits provided for each column of pixels of the pixel array, sequentially receives and processes signals output from the read rows, and when a scanning unit period is H, processes signals of the next read row within an average period of (M/N) H.

* * * * *